United States Patent

[11] 3,621,919

| [72] | Inventor | Rudolph Olson<br>Box 448, Braham, Minn. 55006 |
|---|---|---|
| [21] | Appl. No. | 45,368 |
| [22] | Filed | June 11, 1970 |
| [45] | Patented | Nov. 23, 1971 |

[54] BEACH-CLEANING APPARATUS
3 Claims, 4 Drawing Figs.

[52] U.S. Cl. .................................................. 171/120
[51] Int. Cl. ............................................ H01d 17/02
[50] Field of Search ........................................... 171/120, 136

[56] References Cited
UNITED STATES PATENTS
2,716,932  9/1955  Grounds ...................... 171/120

3,340,934  9/1967  Wycoff ........................ 171/136

Primary Examiner—Antonio F. Guida
Attorney—Reif and Gregory

ABSTRACT: A beach-cleaning apparatus comprising a mobile chassis carrying a plurality of inclined screens, leading elements carried by said screens undercutting the beach surface to pick up beach litter for deposit onto said screens and endless chains with respect to each of said screens, said chains carrying spaced flights and moving the same over said screens to carry said beach litter upwardly of said screens and a receptacle receiving said beach litter discharged from said screens.

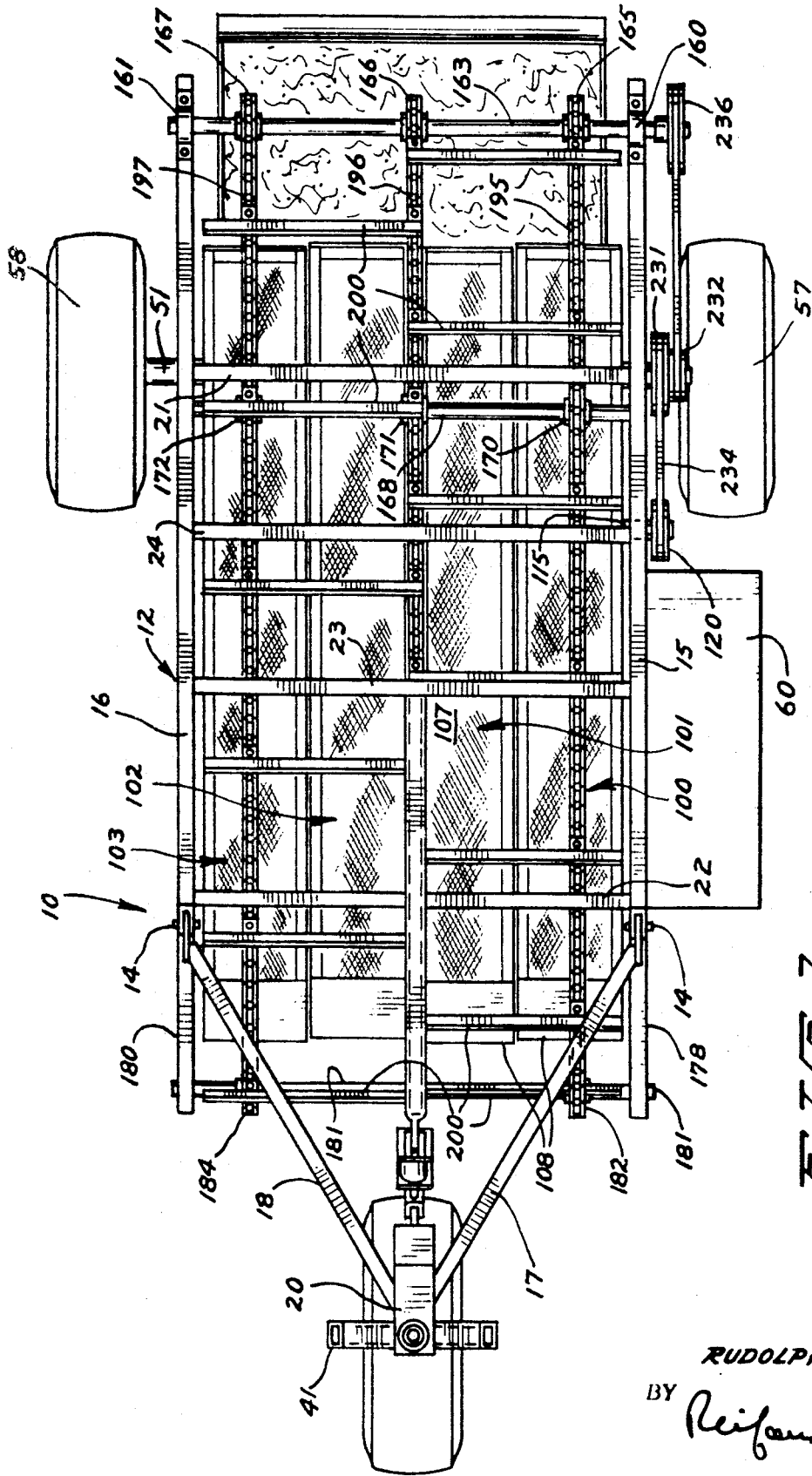

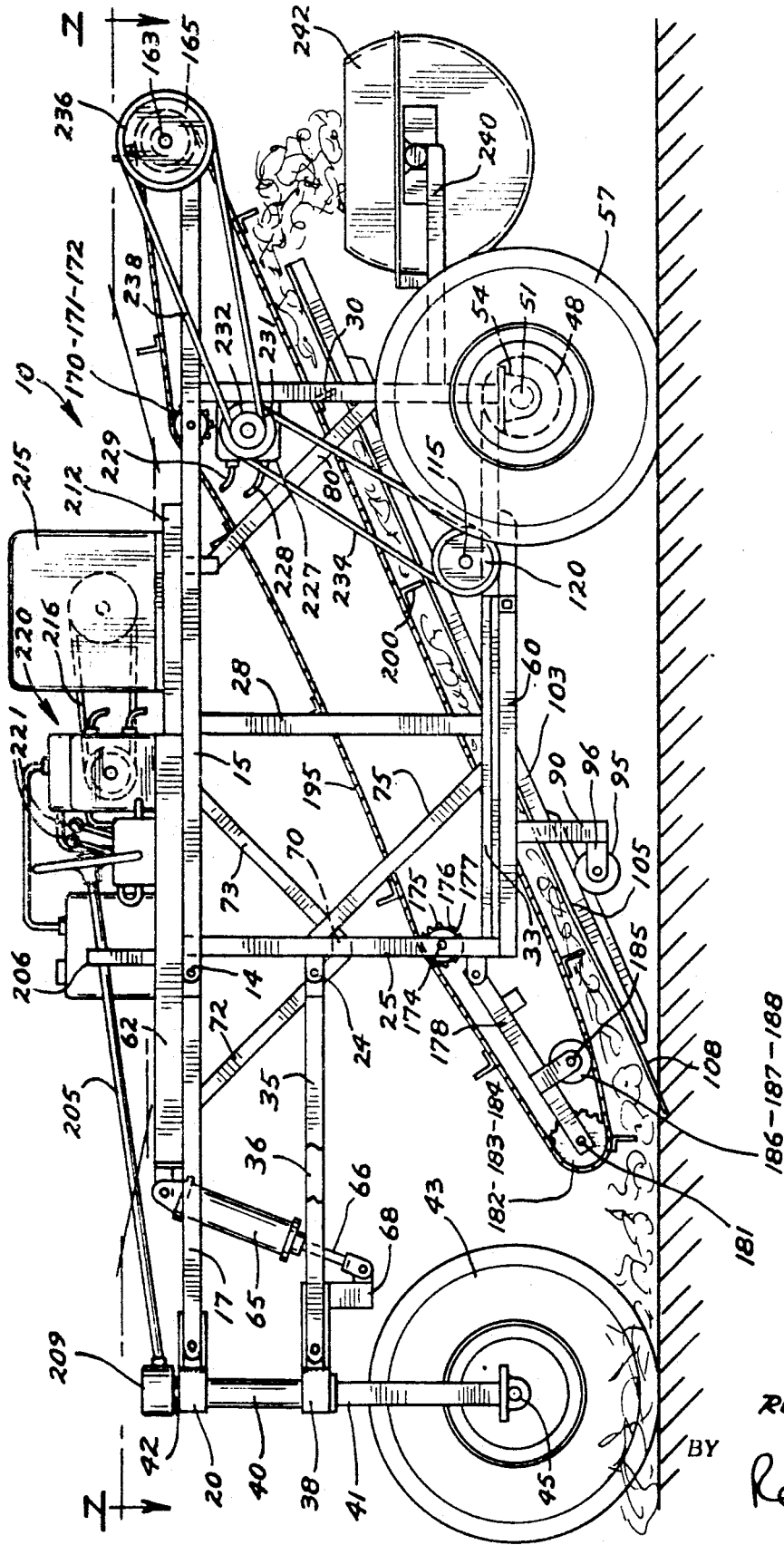

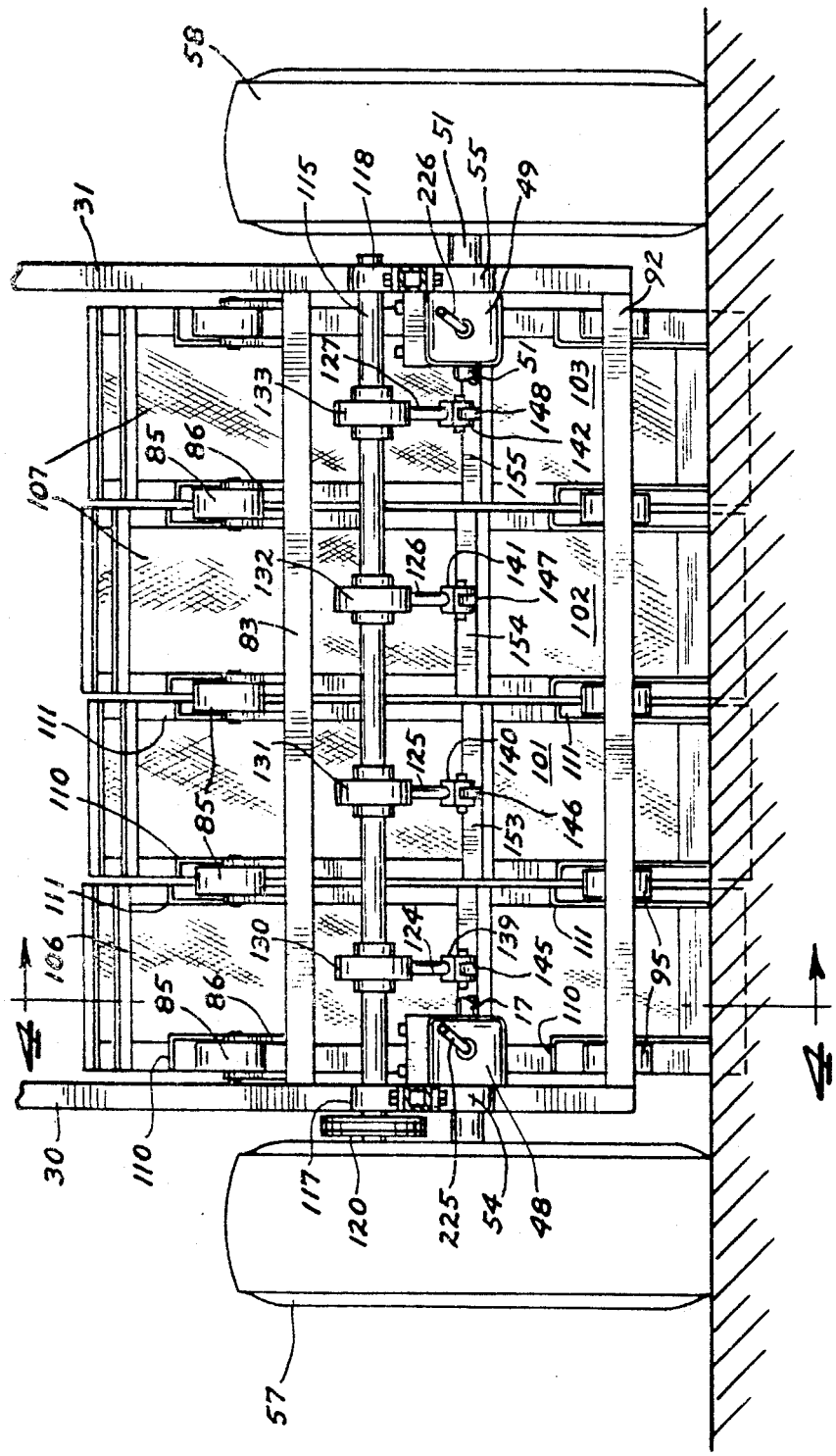

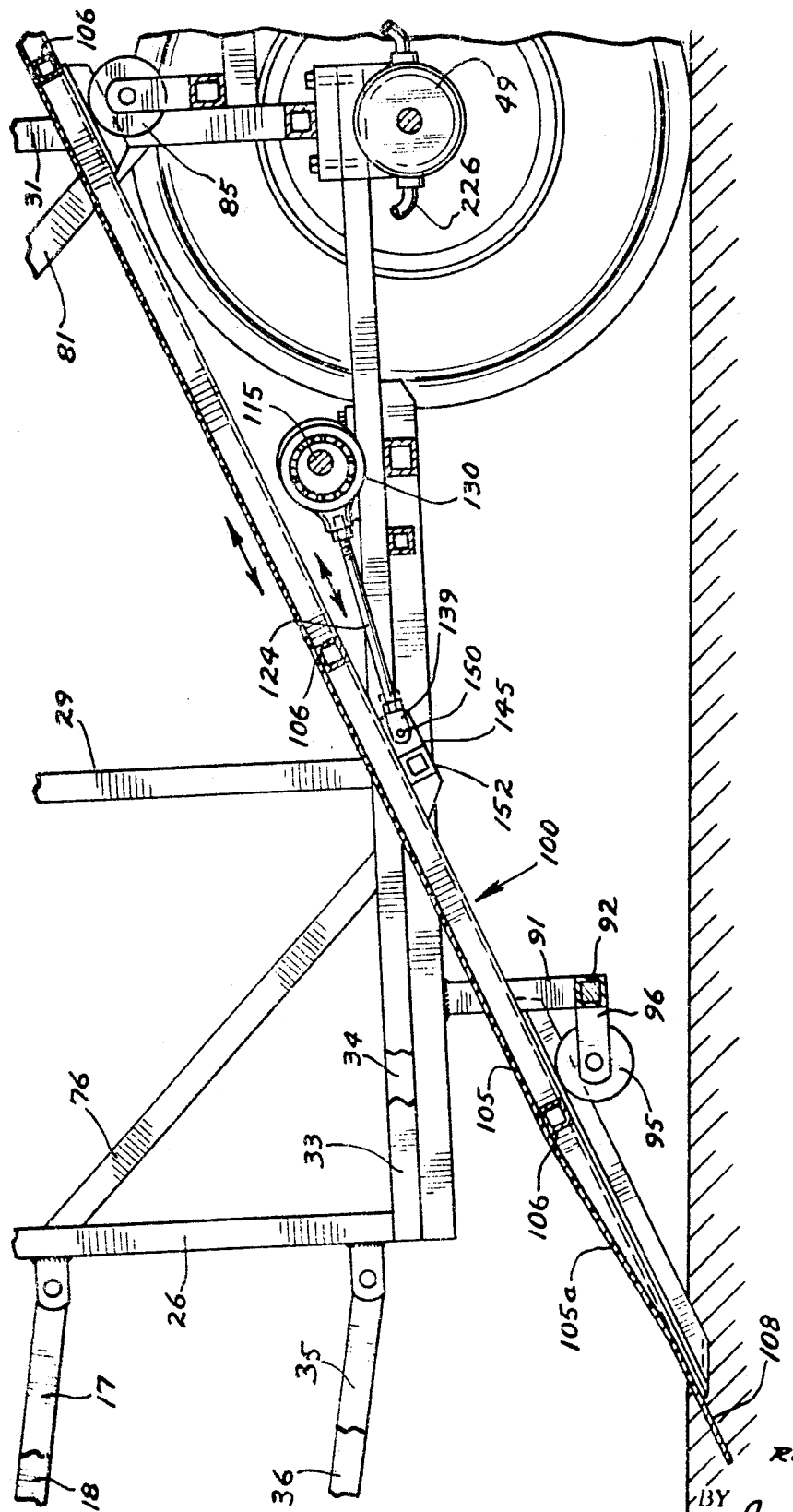

BEACH-CLEANING APPARATUS

BACKGROUND AND SUMMARY OF THE INVENTION

This invention relates to a beach-cleaning apparatus or more specifically to an apparatus for removing litter from the surface of a beach area.

It is desirable to have such a device which can expeditiously and at relatively low cost clean up large beach areas.

Generally stated, the apparatus herein comprises a mobile device which may be self-propelled or drawn having a chassis having mounted thereon a plurality of elevated screens having leading elements undercutting the surface of the beach, means reciprocating said screens and endless conveyors passing over said screens, said conveyors respectively having longitudinal-spaced transverse flights thereon passing over said screens carrying upwardly thereof the litter moved onto said screens by said leading digging elements and a receptacle receiving said litter from said screens.

It is an object of this invention, therefore to provide a mobile device which requires very little manpower for efficiently and economically removing litter from beach areas.

It is another object of this invention to provide an apparatus of simple construction adapted for rapid cleaning of extensive beach areas.

More specifically it is an object of this invention to provide a mobile apparatus requiring a simple operation which by means of flights elevates litter and sand over screens to separate the same and discharge said litter into a receptacle.

These and other objects and advantages of the invention will be set forth in the following description made in connection with the accompanying drawings in which like reference characters refer to similar parts throughout the several views and in which:

FIG. 1 is a top plan view taken on line 1—1 of FIG. 2 as indicated;

FIG. 2 is a view in side elevation of the apparatus herein;

FIG. 3 is a broken view in end elevation; and

FIG. 4 is a broken view in longitudinal vertical section taken on line 4—4 of FIG. 3 as indicated.

DESCRIPTION OF A PREFERRED EMBODIMENT

The beach-cleaning apparatus comprising the invention herein is indicated generally by the reference numeral 10.

Said apparatus comprises a basic frame structure or chassis 12 which is here shown made up of a pair of upper parallel longitudinal frame members 15 and 16 having converging forward end portions 17 and 18 suitably pivoted thereto by pivots 14 and terminating in a pivotal connection with bearing block 20. A pair of spaced crossmembers 22, 23, 24 and 21 extend between said members 15 and 16.

Depending from said frame members 15 and 16 forwardly thereof is a pair of vertical frame members 25 and 26 and spaced rearwardly thereof are like pairs of vertical frame members 28-29 and 30-31.

A pair of parallel lower frame members 33 and 34 respectively connect said vertical frame members at either side of said chassis along the bottom portions thereof.

Pivotally connected to said vertical members 25 and 26 by pivots 24 and converging forwardly thereof in vertical alignment with said members 17 and 18 are frame members 35 and 36 terminating in pivotal connection with a bearing block 38. Connecting said bearing blocks and extending therebetween is a sleeve 40. Journaled in said bearing blocks and extending through said sleeve is the upper or stem portion 42 of a fork 41 having a large balloon-tired wheel 43 carried on an axle 45 journaled in said fork in a conventional manner.

Carried by said frame members 33 and 34 at the rear end portions thereof are conventional hydraulic wheel motors 48 and 49 having an axle 51 extending therethrough to be driven thereby in a conventional manner. Said axle is also journaled in bearing blocks 54 and 55 (FIG. 3) respectively carried by said frame members 30 and 31 and mounted onto each extended end portion of said axle are suitably balloon-tired wheels 57 and 58.

Extending outwardly of said frame member 33 is a step platform or running board 60.

Extending forwardly centrally of said crossmembers 22 and 23 is a frame member 62 having a hydraulic cylinder 65 pivotally carried thereby with said cylinder having its piston rod 66 pivoted to a depending right angled link 68 formed as an extension of said bearing block 38. Said cylinder will hereinafter be further described.

A cross-frame member 70 extends between vertical members 25 and 26 midway thereof and angled forwardly upwardly therefrom and secured to said frame members 15 and 16 are bracing members 72. Also angled upwardly rearwardly of said member 70 and secured to said frame members 15 and 16 are bracing members 73. Said bracing members 72 and 73 are shown in FIG. 2 on one side only of said chassis 12. A pair of transversely spaced bracing members 75 and 76 extend between the members 25-33 and the members 26-34. A pair of transversely spaced bracing members 80 and 81 extend between the members 30-15 and between the members 31-16 respectively.

Extending between the vertical members 30 and 31 as shown in FIG. 3 is a cross-frame member 83 having spaced rollers 85 supported thereabove by brackets 86. It is seen that five rollers support the four screen members to be described.

Depending from said frame members 33 and 34 are stub members 90 and 91 having a crossmember 92 extending therebetween. Extending forwardly of said crossmember 92 and spaced thereacross are brackets 96 carrying rollers 95 which correspond to the rollers 85.

Supported on said rollers 85 and 95 in a forwardly downwardly inclined position are a plurality of screen or perforate plate members of elongated rectangular form each respectively being indicated generally by the reference numerals 100–103. Said screen members are of identical construction with the result that only one will be described in detail together with the operating mechanism in connection therewith.

Said screen member 100 comprises a pair of transversely spaced parallel longitudinal angle frame members 105 having a plurality of crossmembers 106 and overlying the same and suitably secured thereto is a screen or perforated plate 107 of sufficiently coarse mesh to permit sand to pass therethrough but to support litter thereon. Said angle members have upwardly disposed sidewalls to receive said screen or plate member therebetween. Said sidewalls are shown tapered at their forward ends as indicated at 105a.

Carried at the undersides of said angle members 105 are angle bearing plate members 110 and 111 to overlie and rest upon the rollers 85 and 95 as indicated in FIGS. 3 and 4. The angle bearing members 110 and 111 have facing upstanding sidewalls and remote open sides as shown in FIG. 3 whereby said screen members are nicely retained between said sidewalls upon said rollers in transverse spaced relation.

Carried at the forward end of said screen to form a projecting ground-engaging end portion thereof is a plate member 108. As seen in FIG. 2, said screen members are of sufficient length to extend rearwardly up over the rear wheels 57-58 and to extend forwardly to be disposed somewhat rearwardly of the wheel 43.

Referring particularly to FIGS. 3 and 4, a shaft 115 is shown journaled in bearing blocks 117 and 118 respectively carried on frame members 33 and 34 somewhat forwardly of the rear wheels 57 and 58. A pulley 120 is secured to one extended end of said shaft. Carried on said shaft spaced centrally transversely of each of said screen members 100–103 are pitman arms or driving rods 124–127 respectively having driving arrangement with said shaft by conventional eccentric bearings 130–133 and being respectively pivotally connected to said screen members by their respective bifurcated end portions 139–142 pivoted to tongue portions 145–148 by pins 150, said tongue portions projecting from transverse or cross-frame members 152–155 of said screen members 100–103. Said eccentric bearings will be arranged to be out of register or phase with one another as at successive 90° intervals for reciprocation of said screen members.

Supported by the rear end portions of the frame members 15 and 16 and being journaled in bearing blocks 160 and 161 thereon is a shaft 163 carrying sprockets 165-167 spaced thereacross between said frame members 15 and 16.

Forwardly of said sprockets 165-167 is a cross-frame member 168 carrying thereon in a conventional manner idler rollers 170-172 respectively in alignment with said sprockets.

Extending between the vertical frame members 28 and 29 adjacent the lower ends thereof is a shaft 174 carrying thereon in a conventional manner idler rollers 175-177 respectively in alignment with said idler rollers 170-172.

Extending forwardly of said cross-frame member 174 and being hingedly connected thereto in a conventional manner are projecting arms 178 and 180 carrying idler rollers 182-184 on a shaft 181 extending therebetween, and respectively having idler rollers 186-188 carried on a shaft 185 supported thereunder by suitable brackets as shown in FIG. 2.

Passing over said sprocket 165 and idler rollers 170, 175, 182 and 186 is an endless sprocket chain 195. Passing over sprocket 166 and idler rollers 171, 176, 183 and 187 is an endless sprocket chain 196 passing over said sprocket 167 and idler rollers 172, 177, 184 and 188 is an endless sprocket chain 197. Said sprocket chains carry a plurality of flights 200. The three sprocket chains are spaced across the four screen members 100-103 and carry said flights so arranged as to sweep over the surface of said four screen members from bottom to top. A plurality of flight members in spaced relation are carried by the sprocket chains 195-196 to sweep over the screen members 100 and 101 and overlap onto the screen member 102. The sprocket chains 196-197 will carry a like number of said flights in offset relation to said flights carried by said sprocket chains 195-196 and overlap the screen member 102. Said flights sweep over said screen members at the bottom run of said sprocket chains. Said flights may be readily formed as of rubber of suitable durometer.

A steering wheel 205 is provided supported by a bracket 206 and runs to a worm gear casing 209 carried at the upper end of said fork 41 for steering the apparatus.

Suitably mounted on a platform 212 atop the chassis 12 is a suitable gas engine 215 connected by a drive belt 216 to an adjacent hydraulic pump 220. Said hydraulic pump is of conventional structure and is not believed to require further description other than it is operated by appropriate control members indicated by the reference numerals 221.

Lines 225 and 226 will run from said hydraulic pump to said hydraulic rear wheel motors 48 and 49 for movement of the apparatus.

A hydraulic motor 227 connected by lines 228-229 to said hydraulic pump 220 is carried by appropriate brackets secured as to the frame member 30 and has an extended shaft carrying thereon pulleys 231 and 232. An endless belt 234 passes over the pulleys 120 and 231 for reciprocation of the screen members. A pulley 236 is carried by shaft 163 and has a belt 238 pass thereover and over the pulley 232 for operation of the chains carrying the flights. A pair of hydraulic lines not here shown will run from the hydraulic pump 220 to the cylinder 65 for its operation for adjusting the elevation of the front end of the apparatus.

Extending rearwardly of the frame members 30 and 31 is a suitable bracket 240 removably and pivotally carrying a receptacle 242 of a suitable size to receive the debris or beach litter discharged from the screen members 100-103 by the flights 200.

OPERATION

The general operation of the apparatus herein is believed to be clear from the description given of its structure.

Beach areas are extensive and tend to become litter ridden. The apparatus herein is shown embodying the use of four pick up screens 100-103 with said screens having leading plate like portions 108 undercutting the beach surface to pick up surface litter and subsurface and partially buried litter. The screen members are reciprocated as above described to speed up advancement of said leading plate portions 108 in undercutting the beach surface. Further said reciprocation produces a shaking or agitating effect to separate beach sand from the litter moving upwardly of the screen members. The forward movement of the apparatus causes the litter encountered to be moved onto said screen members for engagement by the flight members 200 carried by the sprocket chains 195-197 whereby said litter is moved or swept upwardly of said screen members 100-103 and is discharged over the rear end portions thereof into the receptacle 242.

The hydraulic system which operates the movement of the apparatus and the reciprocation of the screen members is conventional.

The leading edge portions of the screens 100-103 are controlled as to elevation by operation of the hydraulic cylinder 65. Said cylinder will raise or lower the chassis relative to the front wheel 43 at the pivot points 14 and 24 and thus the elevation of the screen members 100-103 is regulated as to ground engagement. The supporting member 62 is cantilevered forwardly of the pivots 14. It will be understood that a change in elevation of only a few inches is all that is under consideration here The apparatus has been demonstrated and has proved to be an efficient and desirable means for the removal of litter from beach areas.

It will of course be understood that various changes may be made in the form, details, arrangement and proportions of the parts, without departing from the scope of the invention herein which, generally stated, consists in an apparatus capable of carrying out the objects above set forth, in the parts and combinations of parts disclosed and defined in the appended claims.

What is claimed is:

1. A beach-cleaning apparatus having in combination,
 a mobile chassis,
 a plurality of elongated forwardly declining perforated plate members having ground-engaging forward end portions picking up litter,
 means in connection with said chassis separately supporting each of said plate members,
 means in connection with said chassis reciprocating out of phase with one another each of said plate members and their respective ground-engaging portions,
 means moving upwardly over said perforate plate members engaging and removing litter therefrom, and
 means carried by said chassis receiving litter discharged from said perforate plate members.

2. The structure set forth in claim 1, wherein
 said perforate plate members are disposed in transverse coplanar relationship,
 spaced rollers carried by said chassis separately supporting said perforate plate members,
 an eccentric bearing member underlying each of said perforate plate members, an arm extending respectively from each of said bearing members to each of said perforate plate members, said bearing members respectively being out of phase with one another, and
 means driving said bearing members and said arms to reciprocate said perforate plate members out of phase with one another.

3. The structure set forth in claim 1, wherein
 said means moving upwardly of said perforate plate members comprise
 a plurality of endless chains which extend longitudinally of said perforate plate members,
 means carried by said chassis respectively support said chains in positions overlying said perforate plate members,
 means drive said chains; and
 flight members carried by said chains transversely of said perforate plate members have operative engagement respectively with said plate members.

* * * * *